June 3, 1941.  E. K. MILLS, JR  2,243,973
AIRPLANE PILOT TRAINER
Filed Nov. 9, 1940  3 Sheets-Sheet 1

Inventor
Edward K. Mills Jr.,
By Bailey J Parson
Attorney

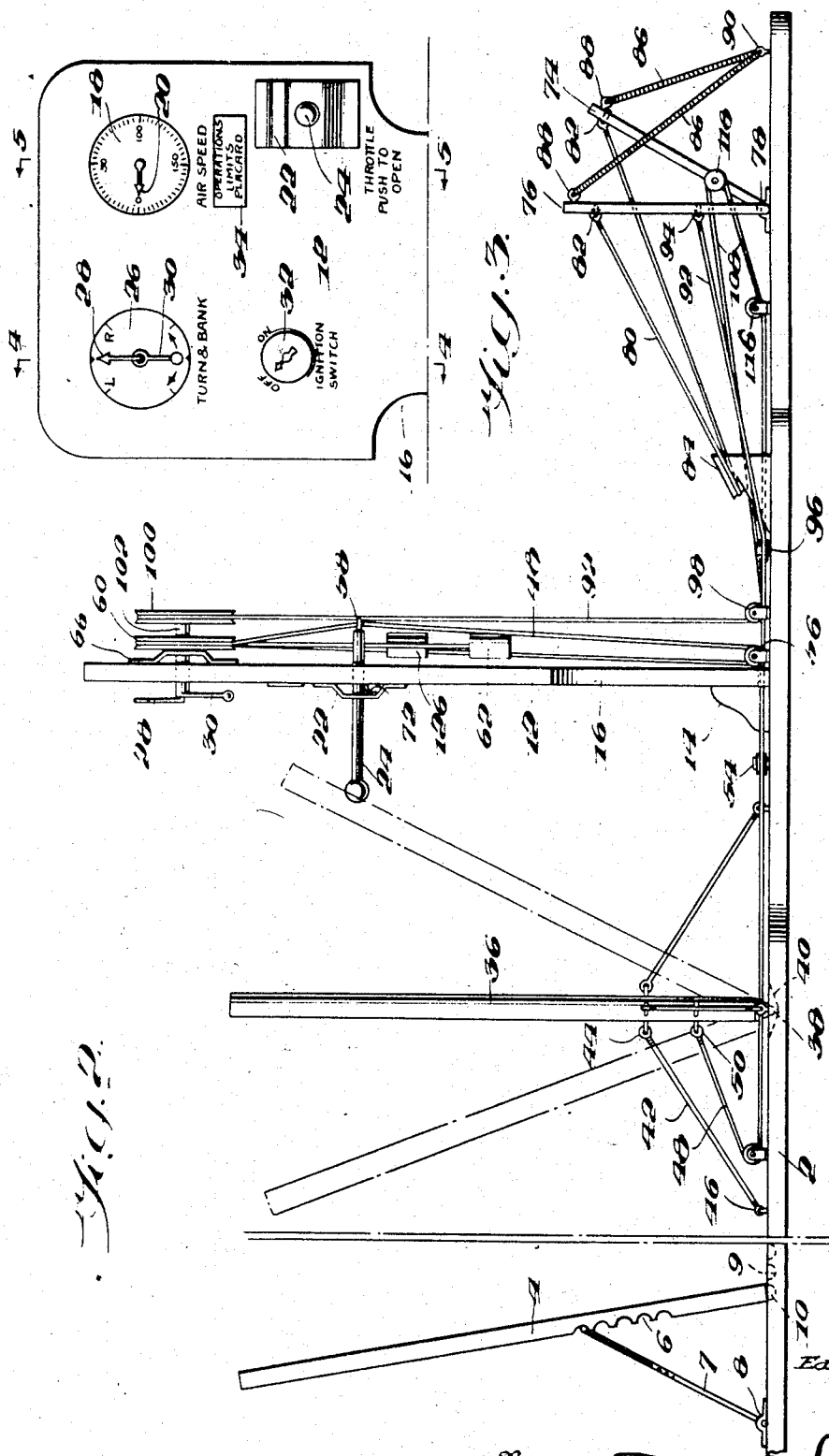

June 3, 1941.  E. K. MILLS, JR  2,243,973
AIRPLANE PILOT TRAINER
Filed Nov. 9, 1940  3 Sheets-Sheet 3
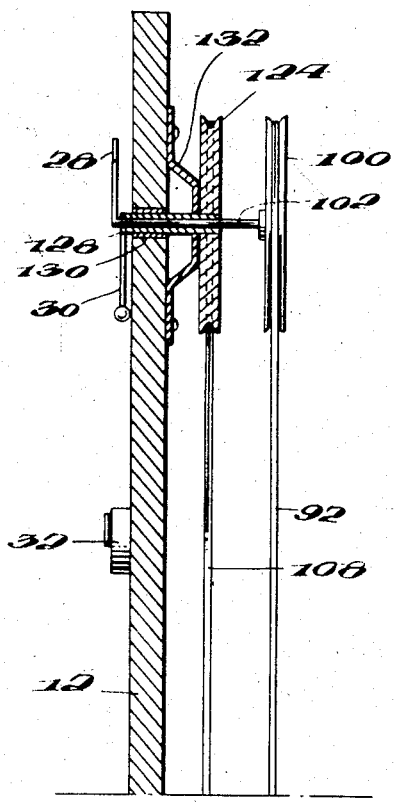
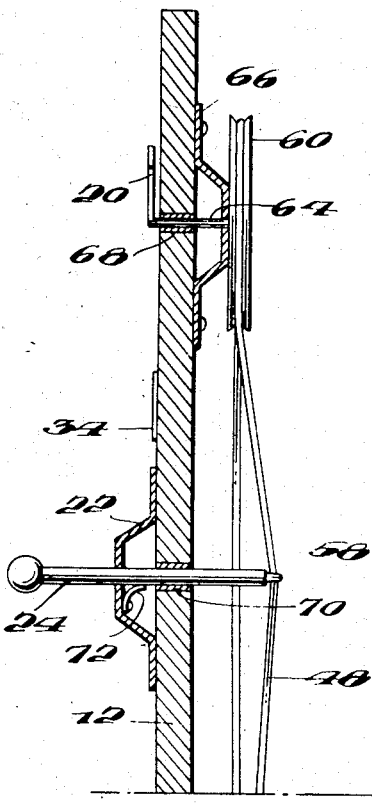
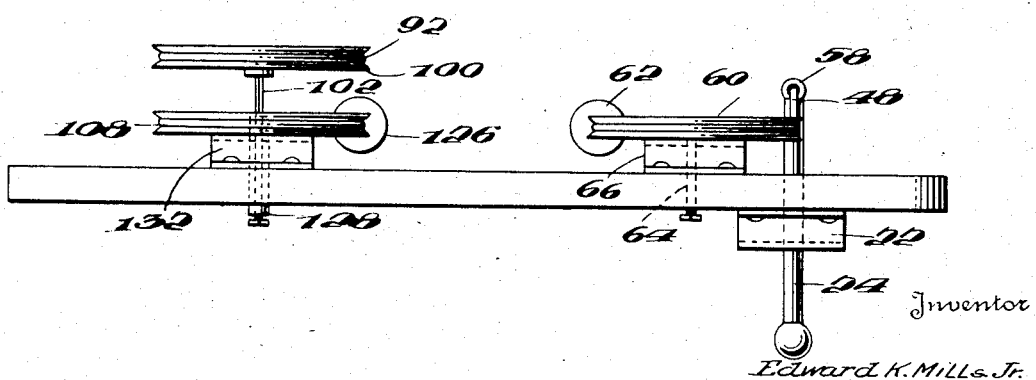

Patented June 3, 1941

2,243,973

UNITED STATES PATENT OFFICE 2,243,973

AIRPLANE PILOT TRAINER

Edward K. Mills, Jr., Morristown, N. J.

Application November 9, 1940, Serial No. 365,088

4 Claims. (Cl. 35—12)

This invention relates to an educational device for practicing airplane manipulation.

The object of the invention is to provide a practice device simulating an airplane cockpit with control members and indicators so interconnected that when the control members are operated the indicators respond in a manner similar to the response of airplane instruments to the corresponding maneuvers.

It is well known that, in piloting an airplane, operation of one control member generally requires correlative operation of other control members. Likewise, a reading of one instrument frequently must be interpreted in its relationship to readings on other instruments. It is therefore an object of the invention to provide turn and bank control elements, turn and bank indicators, and connecting means so arranged that the turn and bank indicators respond not only to movement of their respective control elements but, furthermore, so that the bank indicator responds to movement of the turn control elements. The object in providing these connections and interconnections is to require coordinating movement of the turn and bank controls by the operator of this device similar to the movements required in the operation of an airplane. More particularly, it is an object to develop coordination between manual and pedal movements.

In further keeping with these principles, it is herein proposed to provide a practice device wherein an air speed indicator is responsive both to throttle control and to forward or backward movement of a control stick. Specifically, an object of the invention is to provide an instrument simulating an air speed indicator, connected with a throttle control so that movement of the throttle control which, in an aircraft, would increase the engine speed, will cause the instrument to indicate a corresponding increase in air speed.

It is also proposed to connect a control stick with the air speed indicator so that forward and rearward movement of the stick, which, in an airplane, would cause the airplane to dive and climb, respectively, causes corresponding increase and decrease in the indicated air speed. The object in interconnecting the throttle control and the operating stick is to provide an arrangement in which, when climbing conditions are simulated by rearward movement, for instance, of the control stick which would normally decrease the indicated air speed, the air speed indicator may be maintained in a position to show an air speed above stalling speed by operation of the throttle control to simulate motor acceleration. Conversely, when the control stick is pushed forwardly to simulate diving, the throttle control may be operated in a decelerating manner to retard the indicated air speed.

A further proposal is to apply an operations limit placard showing the maximum allowed speed, stalling speed, climbing speed, and normal flying speed. Whether the device be used for actual instruction or for amusement, it is intended to develop flying technique by teaching the operator to maintain the indicators in their respective proper positions for the particular maneuvers being executed.

The structure fulfilling these and other objectives is illustrated in the following drawings, in which:

Fig. 2 is a side elevation;

Fig. 3 is a front elevation of the indicator panel;

Fig. 4 is a section along the line 4—4 of Fig. 3, looking in the direction of the arrows, and showing the turn and bank indicators;

Fig. 5 is a section along the line 5—5 of Fig. 3, looking in the direction of the arrows, showing the throttle control and air speed indicator connection; and Fig. 6 is a top plane view of the indicator panel.

Figure 1:
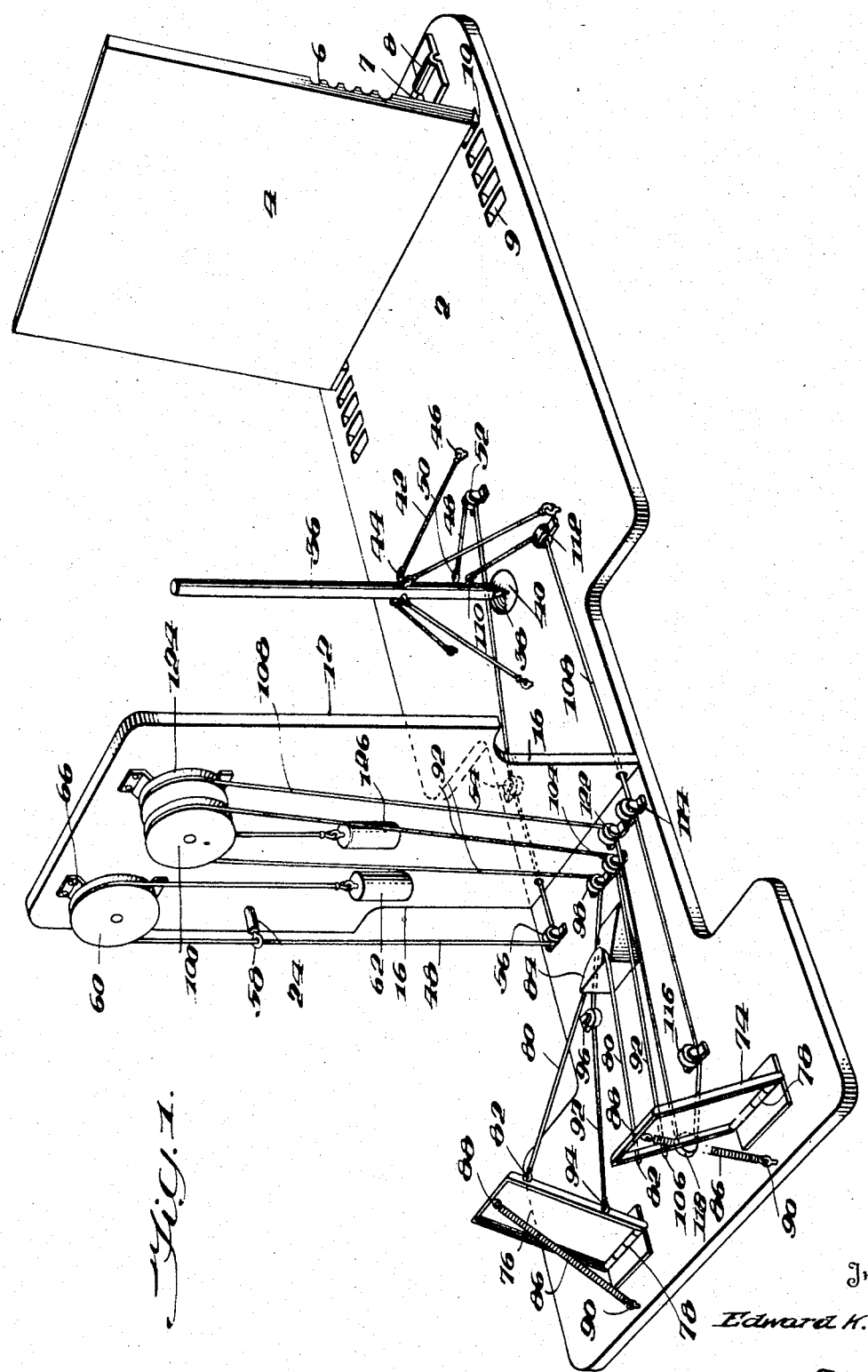
Fig. 1 is a perspective view of the device.

Referring first to Figs. 1 and 2, the structure comprises a base 2 upon which the operator sits. A seat back 4 is adjustably supported near the rear of the base, the seat back 4 being provided with grooves 6 across the back thereof selectively engageable by a U-shaped bail 7 hinged to base 2, as indicated by reference numeral 8, for tilting adjustment. Grooves 9 in the base are selectively engageable by lugs 10 on the bottom of seat back 4 for longitudinal adjustment.

An instrument panel 12 is mounted in upright position on base 2 so that instruments thereon may be observed by the operator. Reinforcing knees 14, as shown in Fig. 2, are secured to the base and panel for stabilizing the panel, and cutouts 16, 16 in the lower side edges of the panel allow the operator to extend his legs therepast.

As shown best in Fig. 3, the instrument panel has on the face thereof the representation of an air speed indicator dial 18, the range of which extends from zero to well past the safe operating speed of the ordinary light airplane. Pointer 20, rotatably mounted on the panel, designates air speed. The position of pointer 20 depends upon the relative positions of certain control elements to be later described.

Below the air speed indicator, a bracket 22 supports throttle control rod 24 which is slidable forwardly and rearwardly. On the left-hand side of panel 12 turn and bank dial 26 and turn and bank pointers 28 and 30 are mounted. A dummy ignition switch 32 is mounted below the turn and bank dial and the panel face assembly is completed by an operations limit placard 34 bearing the designations of the maximum allowed speed, landing or stalling speed, climbing speed and normal flying speed. For economy in manufacture, the dials and placard may be printed on paper and pasted on the face of the panel.

Between the seat back 4 and instrument panel 12, a control stick 36 is mounted on base 2 for universal movement, control stick 36 having a lower, pointed end 38 resting in socket 40 comprising a conical recess in the upper surface of base 2. Control stick 36 is normally held in upright position by four elastic cords secured by eyelets 44 and 46 to the control stick and base, respectively.

The air speed indicator is connected to control stick 36 by cable 48, connected at one end to the back of the control stick as indicated at 50 in Figs. 1 and 2. Cable 48 is roved through guide pulleys 52, 54 and 56, whence it passes through an eye 58 on the forward end of throttle control rod 24 before passing over sheave 60. To the other end of cable 48 a weight 62 is secured for keeping the cable taut.

Sheave 60 is affixed to the front end of the air speed pointer shaft 64, best illustrated in Figs. 5 and 6, supported by bracket 66 for rotation in sleeve bearing 68 extending through panel 12. When control stick 36 is pushed forwardly, cable 48 is pulled against the gravitational force of weight 62 to rotate pointer 20 clockwise, thus indicating the increase in speed which would result in pushing the control stick 36 forwardly to dive an airplane.

Likewise, an increase in indicated speed is accomplished by pushing throttle control rod 24 forwardly from the position indicated in Fig. 1, corresponding to an engine in idling position, to the normal operating position of Figs. 2, 5 and 6. Throttle control rod 24 is longitudinally slidably in sleeve bearing 70 and held in any one of a plurality of adjusted positions by spring 72 which is affixed to bracket 22 to bear against the rod 24.

On the forward portion of base 2, left and right pedals 74 and 76, respectively, are mounted by pivots 78. The pedals are yoked together by cable 80 attached to the pedals by eyelets 82 and passed around a guide block 84 affixed to base 2 so that when one of the pedals is pushed forwardly the other of the pedals is pulled rearwardly. Elastic cords 86 are secured to each of the pedals by eyelets 88, the cords being anchored to base 2 forwardly of the pedals, as indicated by reference numerals 90.

Pedals 74 and 76 drive the turn indicator through a cable 92 secured at one end to right pedal 76 by eyelet 94 and roved through pulleys 96 and 98 on base 2 before passing around sheave 100 on turn indicator shaft 102. From sheave 100, cable 92 is roved back through pulley 104 on base 2 and, finally, secured to left pedal 74, as shown at 106. Thus, when right pedal 76 is pushed forwardly, sheave 100 and turn indicator shaft 102 are rotated counterclockwise, looking at Fig. 1, and left pedal 74 is pulled rearwardly against the tension of the elastic cord 86 secured thereto.

Motion of control stick 36 to the left and right, corresponding to bank control in an airplane, is transmitted by a cable 108 secured at 110 to control stick 36 and roved through pulleys 112, 114 and 116 fixed on base 2. Before reaching the bank indicator, however, cable 108 is coupled to the turn control mechanism through pulley 118 on left pedal 74, thence back through pulley 122 on base 2, and finally over sheave 124 on the bank indicator shaft. A weight 126 is hung on the end of cable 108 to keep it taut.

Referring particularly to Fig. 4, sheave 124 is affixed on a hollow shaft 128, from the other end of which bank indicator 30 depends. Hollow shaft 128, rotatably supporting the inner, turn indicator shaft 102, is rotatably supported by a sleeve bearing 130 through panel 12 and by bracket 132 affixed to the back of the panel.

When control stick 36 is moved to the left, for instance, bank indicating pointer 30 is swung clockwise, or leftwards, looking at Fig. 3.

Because of the coupling, by pulley 118, between the turn and bank control means, bank indicating pointer 30 is moved leftwards when right pedal 76 is pushed forwardly to pull left pedal 74 and pulley 118 to the rear end, in turn, thus allowing weight 126 to pull the end of cable 108 downwardly to take up the slack in the cable. This reaction of the bank indicator corresponds to that when an airplane is turned without compensatory banking so as to cause "skidding" in the direction opposite that in which the turn is made. It is therefore necessary to swing the control stick 36 to the right when the right pedal 76 is depressed and vice-versa in order to prevent undesired skidding indication.

In operation, after preliminary adjustment of ignition switch 32 and throttle control 24 simulating the starting operation in an airplane, throttle control 24 is advanced to move the air speed pointer 20 in a position indicating take-off speed. As control stick 36 is pulled rearwardly, as in take-off, it may be necessary to advance throttle control 24 to maintain take-off speed if control stick 36 is pulled too far or if the throttle control was not sufficiently advanced to allow for the additional effort required for take-off. After flying conditions are assumed, the air speed, turn and bank indicators respond, as previously described, to simulate flying conditions.

It is apparent that other indicators and control members may be added or substituted and that lever systems, rods, or the like may be utilized in lieu of the specific mechanisms shown, the invention being limited only by the scope of the appended claims.

I claim:
1. An airplane training device simulating an airplane cockpit comprising an elongated base, a seat adjacent the rear end of the base and facing forwardly towards the other end, an upright instrument panel affixed to said base forwardly of said seat, a joy stick swiveled to said base between said seat and said instrument panel, left and right pedals pivotally mounted on the base adjacent the front end thereof, said pedals being movable forwardly and rearwardly, means yoking said pedals for moving either of the same rearwardly upon forward movement of the other, a first indicator simulating a turn indicator on said panel, transmission means operatively connecting said first indicator and said pedals for moving said first indicator to the left and right, respectively, upon corresponding turn-controlling movements of said pedals, a second indicator simulating a bank indicator on said panel, a first pulley mounted on said base at one side of said joy stick, a second pulley on one of said pedals, and a cable connected at one end to said joy stick, said cable passing through the first and second pulley and having the other end operatively connected with said second indicator whereby to move said second indicator in left and right bank indicating directions, respectively, when said joy stick is correspondingly moved and whereby to swing said second indicator to right and left bank indicating positions upon forward and rearward movement, respectively, of said left pedal.

2. In an airplane training device as claimed in claim 1, a third indicator simulating an air speed indicator on said panel, said third indicator including a rotatable shaft extending through said panel, a pointer on the rear end of the shaft, a sheave on the front end, a control rod simulating a throttle control slidably mounted through said panel below said sheave, an eyelet on the front end of said rod, a first guide on said base below said sheave and said eyelet, a second guide on said base behind said joy stick, a second cable having one end secured to said joy stick, said second cable passing through said guides, eyelet, and over said sheave, and tensioning means at the other end of said cable for holding said cable taut, whereby to move said third indicator to speed increased and decreased positions upon forward and rearward movement, respectively, of said joy stick and upon forward and rearward movement, respectively, of said control rod.

3. In an airplane training device including an elongated base, a seat back mounted at the rear of said base, an upright instrument panel mounted intermediate the ends of said base and having instruments simulating turn, bank, and air speed indicators thereon, a control stick swiveled to said base between said seat and said panel, transmission means connecting said control stick to said air speed indicator and to said bank indicator, a pair of pedals pivoted to said base forwardly of said instrument panel, pivots connecting the lower ends of said pedals and said base and providing fore-and-aft swinging of said pedals, elastic cords connected to the upper ends of said pedals and to said base forwardly of said pivots, a guide fixed on said base intermediate said pedals and between said pedals and said panel, and a cable passing around said guide and having its ends, respectively, connected to said pedals whereby, when either of said pedals is pushed forwardly, the other of said pedals is pulled rearwardly.

4. In an airplane training device, an elongated, substantially flat base, having a seat mounted adjacent the rear thereof, pedals pivoted on said base adjacent the front thereof, an upstanding instrument panel mounted on said base intermediate said seat and said pedals, indicators on said panel simulating turn, bank and air speed indicators, transmission means operatively connecting said pedals to said turn indicator, a socket on said base between said seat and said panel, an upstanding stick, simulating a joy stick, having its lower end seated in said socket, elastic supporting cords connected at the upper ends to said stick intermediate the upper and lower ends thereof and at their lower ends to said base, said cords, in plan view, substantially forming a cross, and transmission means operatively connecting said stick to said air speed indicator and to said bank indicator.

EDWARD K. MILLS, Jr.